(12) United States Patent
Wild

(10) Patent No.: US 11,817,937 B2
(45) Date of Patent: Nov. 14, 2023

(54) DIFFERENTIATING ORTHOGONALLY MODULATED SIGNALS RECEIVED FROM MULTIPLE TRANSMITTERS AT ONE OR MORE ANTENNA ARRAYS

(71) Applicant: Hubble Network Inc., Las Vegas, NV (US)

(72) Inventor: Ben Juda Wild, Seattle, WA (US)

(73) Assignee: Hubble Network Inc., Las Vegas, NV (US)

(*) Notice: Subject to any disclaimer, the term of this patent is extended or adjusted under 35 U.S.C. 154(b) by 59 days.

(21) Appl. No.: 18/085,494

(22) Filed: Dec. 20, 2022

(65) Prior Publication Data

US 2023/0123773 A1 Apr. 20, 2023

Related U.S. Application Data

(60) Division of application No. 17/886,267, filed on Aug. 11, 2022, now Pat. No. 11,569,904, which is a continuation-in-part of application No. 17/667,984, filed on Feb. 9, 2022, and a continuation-in-part of application No. 17/590,664, filed on Feb. 1, 2022, now Pat. No. 11,621,769, said application No. 17/667,984 is a division of application No. 17/391,914, filed on Aug. 2, 2021, now Pat. No. 11,283,516, said application No. 17/590,664 is a division of application No. 17/391,914, filed on Aug. 2, 2021, now Pat. No. 11,283,516.

(51) Int. Cl.
*H03D 1/00* (2006.01)
*H04B 7/185* (2006.01)
*H04B 7/06* (2006.01)
*H01Q 21/06* (2006.01)

(52) U.S. Cl.
CPC .......... *H04B 7/18515* (2013.01); *H01Q 21/06* (2013.01); *H04B 7/0617* (2013.01)

(58) Field of Classification Search
CPC ... H01Q 21/06; H04B 7/0617; H04B 7/18515; Y02D 30/70
USPC .......................................... 370/252; 375/350
See application file for complete search history.

(56) References Cited

U.S. PATENT DOCUMENTS

| 6,661,857 B1* | 12/2003 | Webster et al. .... H04L 25/0236 375/350 |
| 7,095,376 B1 | 8/2006 | Timothy et al. |
| 8,634,501 B2 | 1/2014 | Gaikwad |

(Continued)

OTHER PUBLICATIONS

International Search Report and Written Opinion, PCT App. No. PCT/US2022/030588, Nov. 21, 2022, 13 pages.
(Continued)

*Primary Examiner* — Tan H Trinh
(74) *Attorney, Agent, or Firm* — Nicholson De Vos Webster & Elliott LLP

(57) ABSTRACT

Techniques for differentiating orthogonally modulated symbols from different transmitters using one or more antenna arrays are described. According to some techniques, symbols received at one or more antenna arrays are grouped together by matching respective sets of receive beams for each symbol. In this manner, symbols received from a first transmitter at a first location can be differentiated from symbols received from a second transmitter at a second location, and both sets of symbols can be successfully decoded. When the symbols are received using frequency hopping, the receive beams for each symbol can be sorted according to path length, which improves performance, and also enables precise location of the transmitter(s).

6 Claims, 11 Drawing Sheets

(56) References Cited

U.S. PATENT DOCUMENTS

| | | | |
|---|---|---|---|
| 10,141,997 B2* | 11/2018 | Nabar et al. | H04B 7/0408 |
| 10,696,428 B2 | 6/2020 | Pellegrino et al. | |
| 11,178,586 B2* | 11/2021 | Luo et al. | H04B 7/0617 |
| 11,245,442 B1 | 2/2022 | Foo et al. | |
| 11,283,516 B1 | 3/2022 | Wild | |
| 2002/0075797 A1 | 6/2002 | Kilani | |
| 2004/0125042 A1 | 7/2004 | Annamaa et al. | |
| 2005/0264448 A1 | 12/2005 | Cox et al. | |
| 2005/0271165 A1 | 12/2005 | Geraniotis et al. | |
| 2007/0183542 A1 | 8/2007 | Geraniotis et al. | |
| 2008/0143636 A1 | 6/2008 | Couchman et al. | |
| 2009/0125780 A1 | 5/2009 | Taylor et al. | |
| 2011/0051612 A1* | 3/2011 | Van Driest et al. | H04B 1/7075 370/252 |
| 2018/0151938 A1 | 5/2018 | Rudys et al. | |
| 2019/0064364 A1 | 2/2019 | Boysel et al. | |
| 2019/0207676 A1 | 7/2019 | Noerpel et al. | |
| 2019/0288898 A1 | 9/2019 | Ibrahim et al. | |
| 2020/0212999 A1 | 7/2020 | Katagi | |
| 2020/0365966 A1 | 11/2020 | Honour et al. | |
| 2021/0068077 A1 | 3/2021 | Raghavan et al. | |
| 2021/0115274 A1 | 4/2021 | Weiss et al. | |
| 2021/0167875 A1 | 6/2021 | Shen et al. | |
| 2021/0218150 A1 | 7/2021 | Mansour | |
| 2021/0249763 A1 | 8/2021 | Burgoyne et al. | |
| 2021/0265729 A1* | 8/2021 | Pond et al. | H04B 7/0617 |
| 2022/0094428 A1 | 3/2022 | Rainish et al. | |
| 2022/0314233 A1 | 10/2022 | Zhou et al. | |
| 2022/0338024 A1 | 10/2022 | Barker et al. | |

OTHER PUBLICATIONS

Notice of Allowance, U.S. Appl. No. 17/391,914, Nov. 18, 2021, 10 pages.
Notice of Allowance, U.S. Appl. No. 17/590,664, Feb. 1, 2023, 2 pages.
Notice of Allowance, U.S. Appl. No. 17/590,664, Jan. 26, 2023, 9 pages.
Notice of Allowance, U.S. Appl. No. 17/886,267, Jan. 5, 2023, 2 pages.
Notice of Allowance, U.S. Appl. No. 17/886,267, Nov. 18, 2022, 13 pages.
Requirement for Restriction/Election U.S. Appl. No. 17/391,914, Oct. 20, 2021, 6 pages.

* cited by examiner

DIFFERENTIATING ORTHOGONALLY MODULATED SIGNALS RECEIVED FROM MULTIPLE TRANSMITTERS AT ONE OR MORE ANTENNA ARRAYS

CROSS-REFERENCE TO RELATED APPLICATIONS

This application is a divisional of U.S. Application No. 17/886,267, filed on Aug. 11, 2022, which is a continuation-in-part of U.S. Application No. 17/667,984, filed on Feb. 9, 2022, and a continuation-in-part of U.S. Application No. 17/590,664, filed on Feb. 1, 2022, which are both divisions of U.S. Application No. 17/391,914, filed on Aug. 2, 2021, issued as U.S. Pat. No. 11,283,516. Each of the priority applications is hereby incorporated by reference herein as if fully set forth.

BACKGROUND

A low-power wide-area network (LPWAN) is a type of wireless telecommunication wide area network designed to allow long-range communications at a low bit rate among connected objects, such as sensors operated on a battery. Several LPWANs use a class of signals called orthogonal signals, which help to increase range and reduce decoder complexity. Examples of orthogonal signals include Chirp Spread Spectrum, used by the LoRa standard, and M-ARY FSK.

BRIEF DESCRIPTION OF DRAWINGS

Various embodiments in accordance with the present disclosure will be described with reference to the drawings, in which.

DETAILED DESCRIPTION

Figure 1:
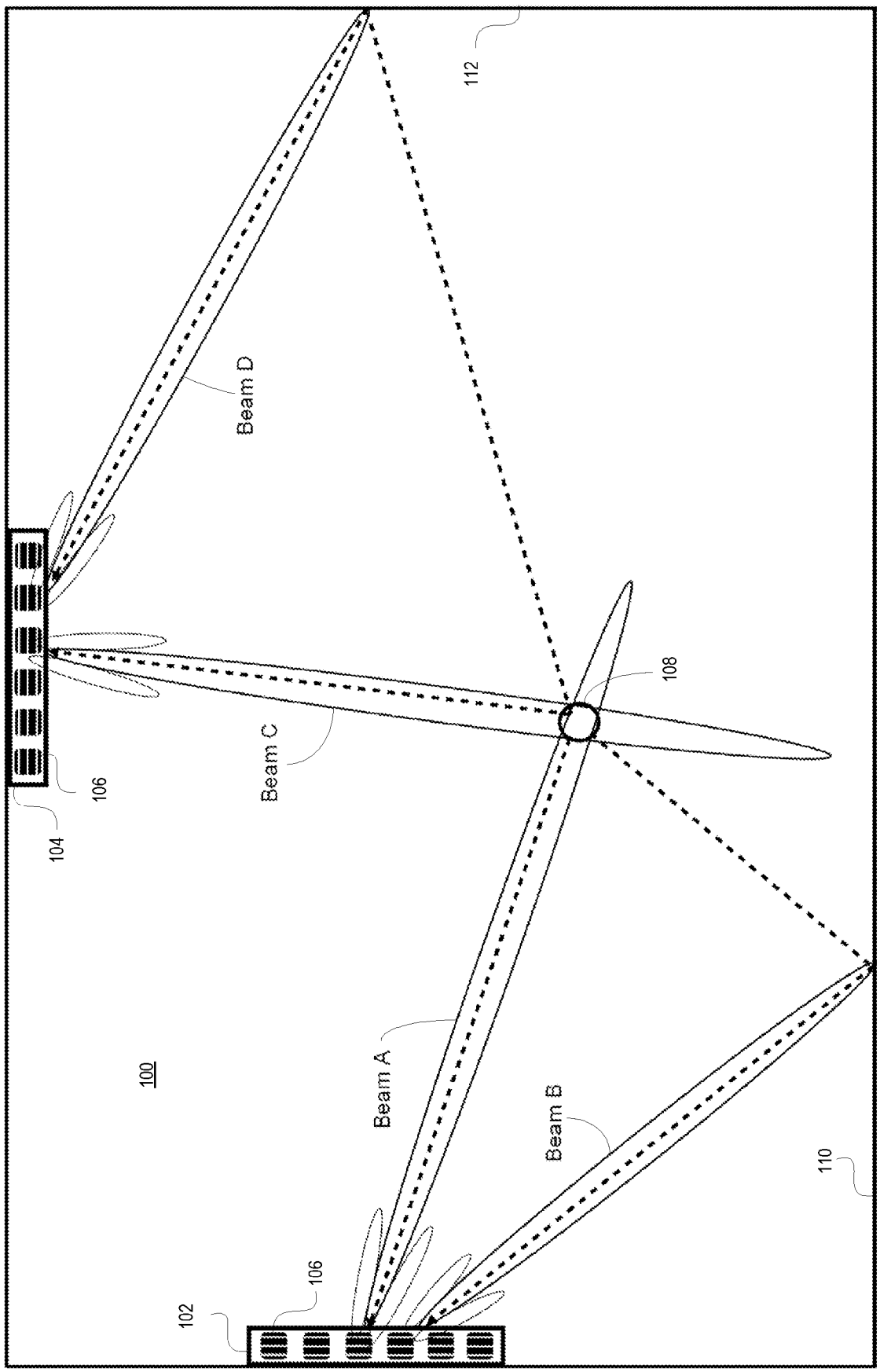
FIG. 1 is a schematic diagram illustrating a simple two-dimensional example of a terrestrial use case including multipath propagation according to some of the present embodiments.

The present disclosure relates to wireless communications, particularly distinguishing wireless signals received from multiple transmitters at one or more receive antenna arrays. In orthogonal signaling, one of $2^M$ signals is transmitted to encode M bits of information. Orthogonal signaling typically requires more frequency spectrum than would be required when using a non-orthogonal signal set, such as Binary Phase Shift Keying (BPSK). This creates a poor spectral efficiency (low bits/s/Hz) for a wireless communication system that uses orthogonally modulated signals. In addition, when two transmitters transmit orthogonally modulated signals where the frequencies transmitted are both within the range of the $2^M$ frequencies used in the modulation, the receiver cannot determine which symbol corresponds to which transmitter.

One technique for improving the spectral efficiency of orthogonal signaling is a multi-array beamforming approach. This technique, which is briefly outlined below, is described in greater detail in U.S. Pat. No. 11,283,516, entitled Multi-Spoke Beamforming for Low-Power Wide Area Satellite and Terrestrial Networks, issued on Mar. 22, 2022, the entire contents of which are incorporated herein by reference as if fully set forth.

In the multi-array beamforming approach, two elongate (e.g., linear, oblong, etc.) antenna arrays on a satellite are oriented perpendicular to each other with the antennas pointed toward Earth. A transmitter on the ground transmits a preamble signal. Each antenna array on the satellite generates multiple receive beams on the ground, and one of the receive beams on each of the perpendicular antenna arrays detects the preamble signal. The beams that detect the preamble signal are designated as the X-beam and the Y-beam, because they correspond to the X and Y coordinates, respectively, of a point in space that corresponds to a ground location of the transmitter.

When the two antenna arrays on the satellite both pick up the same preamble sequence, an (X,Y) coordinate is assigned to that preamble sequence. The receiver is now time, frequency, and spatially synchronized to the preamble, and is ready to begin decoding data symbols that arrive after the preamble symbols. The receiver then begins decoding data symbols that arrive after the preamble symbols at the correct times, frequency ranges, and the same (X,Y) beams as the preamble sequence. By estimating an X,Y position for each data symbol, multiple data symbols from different transmitters (may also be referred to as endpoints) that could have been in the same frequency range of the M-ARY FSK signal set can now be differentiated, as long as they are at different positions on the ground (when different sets of X,Y beams pick up each of the data symbol transmissions).

Some of the present embodiments improve spectral efficiency for orthogonally modulated signals in terrestrial use cases, in contrast to the satellite use case described above. In some embodiments, the antenna arrays may be installed in outdoor locations, similar to cellular base stations. In other embodiments, the antenna arrays may be installed in indoor locations, for example to provide a wireless IoT (Internet of Things) network in a warehouse.

One technical problem in terrestrial use cases is multipath propagation. In radio communication, multipath propagation (or, simply, multipath) is a propagation phenomenon that causes radio signals to reach the receiving antenna by two or more paths. Causes of multipath include reflection from water bodies and terrestrial objects, such as hills and buildings. When the same signal is received over more than one path, it can create interference and phase shifting of the signal. Destructive interference causes fading, which may cause a radio signal to become too weak in certain areas to be received adequately. For this reason, this effect is also known as multipath interference or multipath distortion.

In contrast to the satellite use case, in which the signal travels from a transmitter on the ground directly to the satellite along only one radio path, in the terrestrial use case there may be one or more objects between the receiver and the transmitter, and/or there may be one or more objects near one or both of the receiver and the transmitter. These objects may create multipath radio reflections, causing the signal from the transmitter to be detected by more than one receive beam of the antenna array(s). Some of the present embodiments solve this technical problem by sorting symbols received from different transmitters according to the sets of receive beams that received the symbols. For example, when the antenna arrays receive a first preamble symbol sequence at a first set of receive beams, data symbols received at the same (first) set of receive beams after the first preamble symbol sequence are grouped together with the first preamble symbol sequence and subsequently decoded. Similarly, when the antenna arrays receive a second preamble symbol sequence at a second set of receive beams, where the second set of receive beams is different from the first set of receive beams, data symbols received at the same (second) set of receive beams after the second preamble symbol sequence are grouped together with the second preamble symbol sequence and subsequently decoded. In this manner, symbols received from a first transmitter at a first location can be differentiated from symbols received from a second transmitter at a second location, and both sets of symbols can be successfully decoded.

FIG. 1 illustrates a simple two-dimensional example of a terrestrial use case including multipath propagation according to some of the present embodiments. FIG. 1 is a top-down view of an indoor environment 100 including walls, where the floor of the indoor environment 100 is parallel to the plane of the figure. In some embodiments, two or more antenna arrays are arranged in geographically separate locations, where each antenna array is mounted such that a long axis of the array is parallel to the ground and in an orientation that allows for creation of radio beams parallel to the ground. In the example shown in FIG. 1, two antenna arrays (a first antenna array 102 and a second antenna array 104) are provided, but in other examples any number of arrays may be provided, including one. Also in the example shown in FIG. 1, each of the antenna arrays 102, 104 includes six antennas 106, but in other examples each of the antenna arrays 102, 104 may include any number of antennas 106, and the number of antennas 106 at each antenna array 102, 104 may be unequal. Each antenna array 102, 104 further includes analog and/or digital beamforming circuitry (not shown).

Each antenna array 102, 104 creates N receive radio beams, where N may be equal to the number of antennas 106 at that antenna array. When a transmitter 108 (may also be referred to as an endpoint) sends a symbol (e.g., a preamble symbol or a data symbol), the symbol may be received by both of the first and second antenna arrays 102, 104. Due to multipath reflections, however, each of the first and second antenna arrays 102, 104 may receive the symbol at more than one receive beam. For example, the first antenna array 102 receives the symbol at Beam A, via a direct line-of-sight path, and at Beam B, via a path that includes a reflection off of a first wall 110 of the environment 100, and the second antenna array 104 receives the symbol at Beam C, via a direct line-of-sight path, and at Beam D, via a path that includes a reflection off of a second wall 112 of the environment 100.

According to some of the present embodiments, when a preamble symbol sequence is sent from the endpoint 108 and received by the first and second antenna arrays 102, 104, for each follow-on data symbol that is transmitted by the endpoint 108 that belongs to the same packet, the same beams from each antenna array 102, 104 should receive the symbols (assuming that the endpoint motion is fairly small during the packet transmission). Thus, continuing with the example illustrated in FIG. 1, if the first antenna array 102 receives a preamble symbol at Beam A and at Beam B, any follow-on data symbols transmitted by the endpoint 108 that belong to the same packet should also be received at Beam A and at Beam B. Similarly, if the second antenna array 104 receives the preamble symbol at Beam C and at Beam D, any follow-on data symbols transmitted by the endpoint 108 that belong to the same packet should also be received at Beam C and at Beam D. It should be appreciated that the example illustrated in FIG. 1, in which the preamble symbol is received at two beams of each antenna array 102, 104, is not limiting. In various embodiments, the preamble symbol may be received at any number of receive beams of a given antenna array, including one, two, three, four, five, etc., and in some instances a given antenna array may not receive a preamble symbol at all. In other words, one or more antenna arrays in a given environment may receive a preamble symbol while one or more other antenna arrays in the same environment may not.

Continuing with the example illustrated in FIG. 1, if another endpoint (not shown) in the environment 100 that is located at a different position than the illustrated endpoint 108 transmits symbols, those symbols would likely be received by different beams at the first and second antenna arrays 102, 104 (e.g., Beam E and Beam F at the first antenna array 102 and Beam G and Beam H at the second antenna array 104). Thus, according to some of the present embodiments, for multiple endpoints transmitting symbols that overlap in time, the symbols can still be differentiated spatially using the set of beams at which each symbol is received. For example, all symbols received at Beam A and Beam B of the first antenna array 102 and at Beam C and Beam D of the second antenna array 104 can be grouped together in a first group, while all symbols received at Beam E and Beam F of the first antenna array 102 and at Beam G and Beam H of the second antenna array 104 can be grouped together in a second group. In this manner, symbols from different transmitters that overlap in time can be differentiated from one another, grouped together with other symbols from the same transmitter, and successfully decoded.

In one example process according to some of the present embodiments, two or more elongate (e.g., linear or oblong) antenna arrays are mounted such that each array is parallel to the ground (or floor for an indoor use case). In some embodiments, the arrays are spaced far enough away from each other so that the positions of transmitters can be determined by intersecting the receive beams from each array that pick up the same transmission. This process is described in further detail below. A preamble is transmitted from an endpoint on or near the ground. Each antenna array generates multiple receive beams, and one or more of the receive beams at each antenna array detects the preamble signal. One beam of a given antenna array will detect the preamble signal when there are no radio reflections, and more than one beam of a given antenna array will detect the preamble signal when there are multipath radio reflections. When two or more antenna arrays detect the same preamble sequence, a group of beams from each antenna array that detected the preamble sequence is associated with the preamble sequence. The receiver is now time, frequency, and spatially synchronized to the preamble and is ready to begin decoding the data symbols that arrive after the preamble symbols. The receiver starts decoding data symbols that arrive after the preamble sequence at the correct times, frequency ranges, and at the same group of beams (matched for all the antenna arrays) as the preamble sequence.

Figure 2:
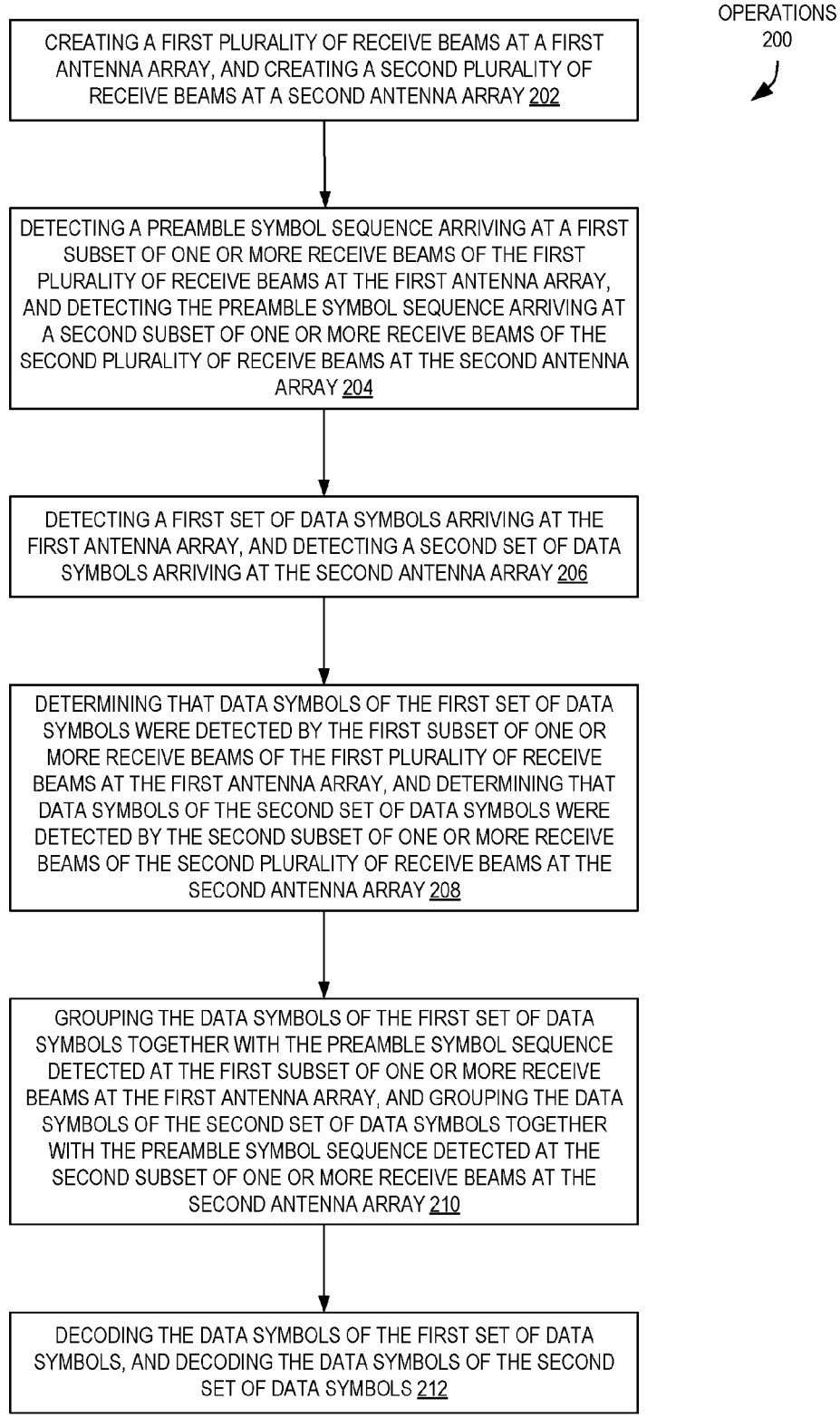
FIG. 2 is a flow diagram illustrating operations of a method for differentiating signals received from multiple transmitters at multiple antenna arrays according to some embodiments.

FIG. 2 illustrates an example method 200 for differentiating signals received from multiple transmitters at multiple antenna arrays according to some embodiments. The method 200 of FIG. 2 may be practiced, in some embodiments, using antenna arrays similar to those shown in FIG. 1, which are described above. With reference to FIG. 2, the example method 200 comprises, at block 202, creating a first plurality of receive beams at a first antenna array, and creating a second plurality of receive beams at a second antenna array. The example method 200 further comprises, at block 204, detecting a preamble symbol sequence arriving at a first subset of one or more receive beams of the first plurality of receive beams at the first antenna array, and detecting the preamble symbol sequence arriving at a second subset of one or more receive beams of the second plurality of receive beams at the second antenna array. The example method 200 further comprises, at block 206, detecting a first set of data symbols arriving at the first antenna array, and detecting a second set of data symbols arriving at the second antenna array. The example method 200 further comprises, at block 208, determining that data symbols of the first set of data symbols were detected by the first subset of one or more receive beams of the first plurality of receive beams at the first antenna array, and determining that data symbols of the second set of data symbols were detected by the second subset of one or more receive beams of the second plurality of receive beams at the second antenna array. The example method 200 further comprises, at block 210, grouping the data symbols of the first set of data symbols together with the preamble symbol sequence detected at the first subset of one or more receive beams at the first antenna array, and grouping the data symbols of the second set of data symbols together with the preamble symbol sequence detected at the second subset of one or more receive beams at the second antenna array. The example method 200 further comprises, at block 212, decoding the data symbols of the first set of data symbols, and decoding the data symbols of the second set of data symbols.

Figure 3:
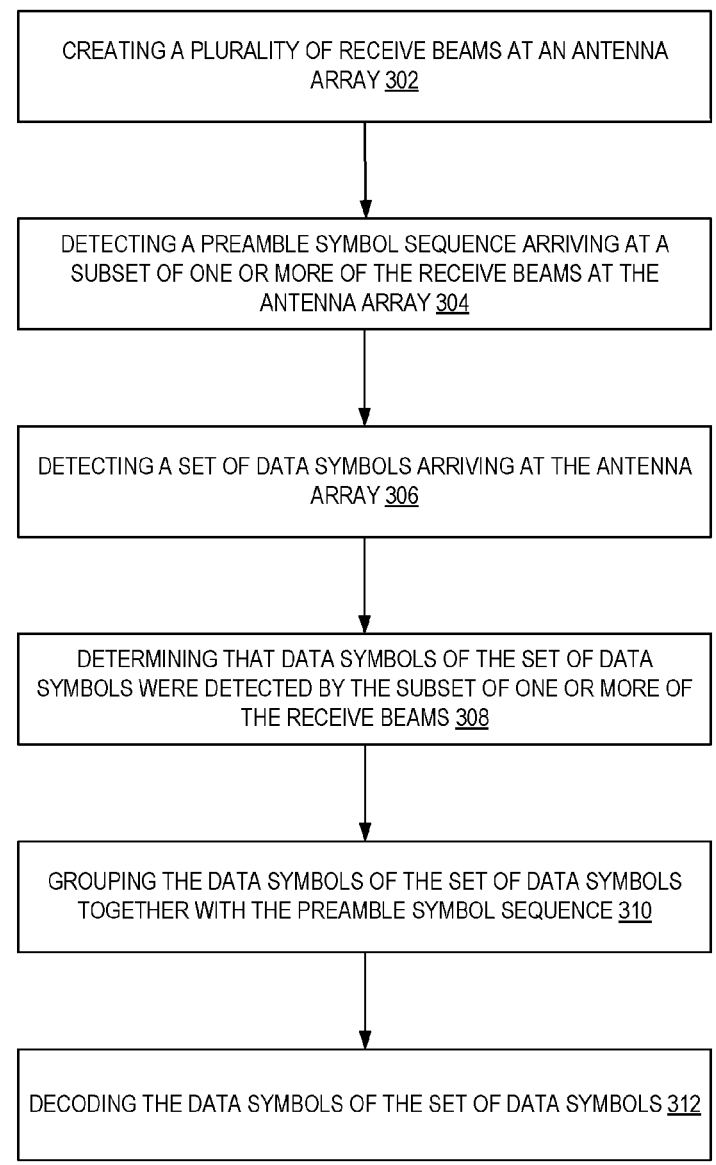
FIG. 3 is a flow diagram illustrating operations of a method for differentiating signals received from multiple transmitters at a single antenna array according to some embodiments.

In some embodiments, symbols from different transmitters that overlap in time can be differentiated from one another, grouped together with other symbols from the same transmitter, and successfully decoded using only a single antenna array. For example, FIG. 3 illustrates an example method 300 for differentiating signals received from multiple transmitters at a single antenna array according to some embodiments. The method 300 of FIG. 3 may be practiced, in some embodiments, using a single antenna array that is similar to the antenna arrays shown in FIG. 1, which are described above. With reference to FIG. 3, the example method 300 comprises, at block 302, creating a plurality of receive beams at an antenna array. The example method 300 further comprises, at block 304, detecting a preamble symbol sequence arriving at a subset of one or more of the receive beams at the antenna array. The example method 300 further comprises, at block 306, detecting a set of data symbols arriving at the antenna array. The example method 300 further comprises, at block 308, determining that data symbols of the set of data symbols were detected by the subset of one or more of the receive beams. The example method 300 further comprises, at block 310, grouping the data symbols of the set of data symbols together with the preamble symbol sequence. The example method 300 further comprises, at block 312, decoding the data symbols of the set of data symbols.

When using a preamble signal that is frequency hopping, as it is in orthogonal signaling, performance of the foregoing processes can be improved in some embodiments as described below. When two or more antenna arrays pick up the same preamble sequence, as in the foregoing processes, a group of receive beams from each antenna array that detected the preamble sequence is associated with the preamble sequence. However, in the improved process the group of receive beams is a sorted list in which the beams are sorted according to path length. For example, the sorted list may include a list of receive beams from each antenna array that detected the preamble sequence, where the list is sorted from shortest path length to longest path length (or vice versa). In some embodiments, the path length for the received signal corresponding to each receive beam can be computed using the beam sorting algorithm described below.

In some embodiments, assume beams 1... k receive the same symbol (referred to here as the first symbol). Then the expression for the received signal on beam k is:

$$y_k(t) = a_k e^{j(2\pi f_c(t-t_k)+\theta)},$$

where
$a_k$ is the received signal strength on beam k;
$t_k$ is the propagation delay on beam k; and
$\theta$ is the initial transmit phase of the first symbol.

The phase difference between beam k and beam 1 is defined as $\psi_{k_1}$, where $$\psi_{k_1} = 2\pi f_c(t_1 - t_k) \quad (1)$$

The phase difference between beam k and beam 1 at the frequency of the next symbol (where the data symbols frequency hop to encode data; referred to here as the second symbol) is:

$$\psi_{k_1, f_s} = 2\pi(f_c + f_s)(t_1 - t_k) \quad (2)$$

Subtracting expression (2) from expression (1) provides the phase difference between beam k and beam 1 at the two different frequencies of the second symbol and the first symbol:

$$\psi_{k_1} - \psi_{k_1, f_s} = 2\pi f_s(t_k - t_1) \quad (3)$$

To avoid a phase wraparound ambiguity, the absolute value of expression (3) should be less than $\pi$:

$$|\psi_{k_1} - \psi_{k_1, f_s}| < \pi$$

Therefore:

$$|f_s| < \frac{1}{|2*(t_1 - t_k)|} \quad (4)$$

In an urban environment, the delay spread ($t_1 - t_k$) is preferably less than 15 µs, in some embodiments. (See http://www.wirelesscommunication.nl/reference/chaptr03/fading/delayspr.htm.) Substituting that value into expression (4) yields:

$$f_s < 33 kHz$$

In an indoor environment, the delay spread ($t_1 - t_k$) is preferably less than 300 ns, in some embodiments. (See http://www.wirelesscommunication.nl/reference/chaptr03/fading/delayspr.htm.) Substituting that value into expression (4) yields:

$$f_s < 1.65 MHz$$

If $\psi_{k_1} - \psi_{k_1,fs} > 0$, then the path length of beam 1 is longer than the path length of beam k. Using this relationship enables all of the receive beams for a given symbol to be sorted according to path length. The receiver is now time, frequency, and spatially synchronized to the preamble, and is ready to begin decoding the data symbols that arrive after the preamble symbols. The receiver starts decoding data symbols that arrive after the preamble sequence at the correct times, frequency ranges, and the same sorted list of beams as the preamble sequence. Each data symbol is compared to the preamble sequence and the path length estimation algorithm described above is used to create the sorted list of path lengths for each new data symbol that is received at the receiver.

Figure 4:
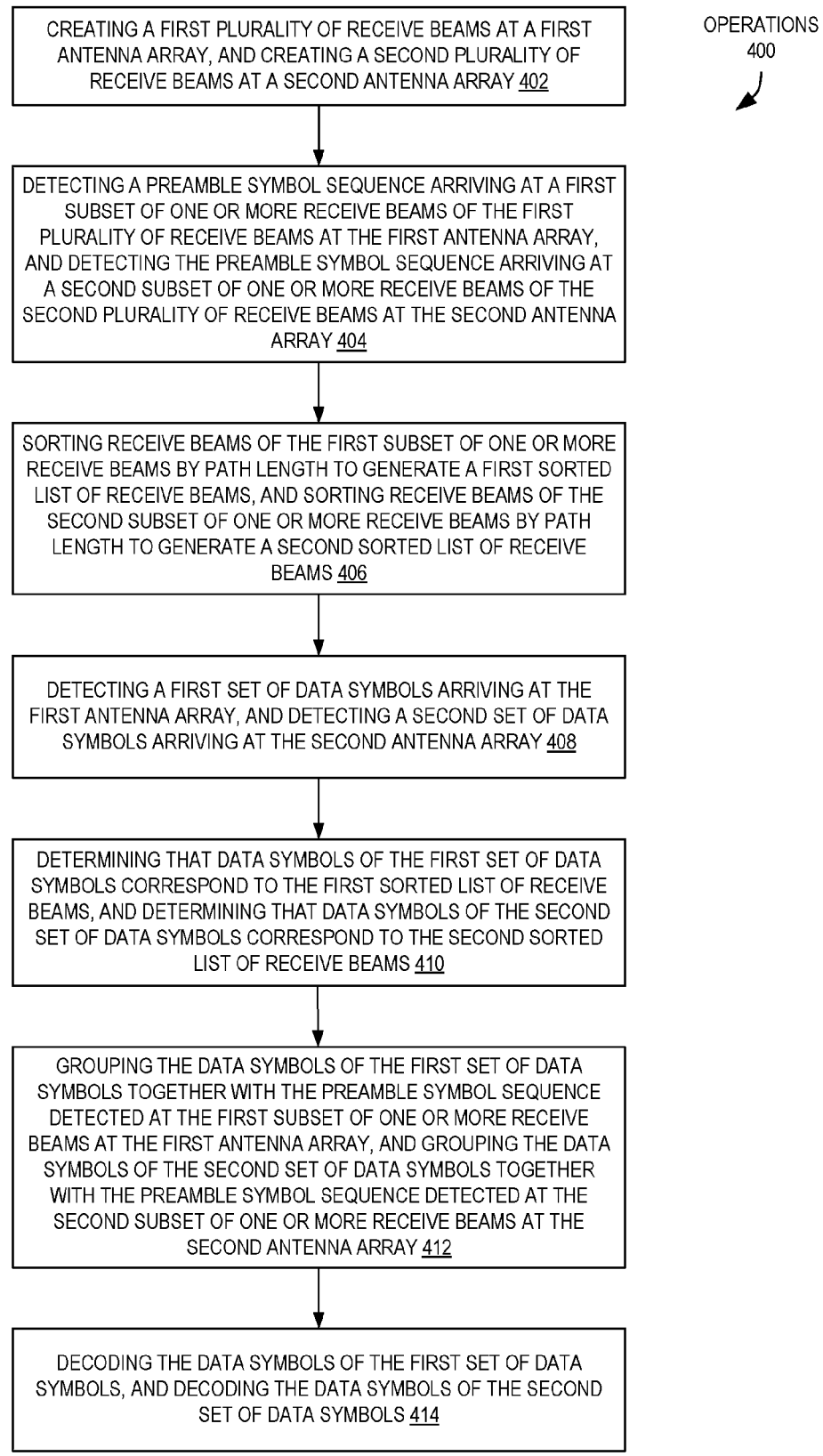
FIG. 4 is a flow diagram illustrating operations of a method for differentiating orthogonally modulated signals received from multiple transmitters at multiple antenna arrays according to some embodiments.

FIG. 4 illustrates an example method 400 for differentiating orthogonally modulated signals received from multiple transmitters at multiple antenna arrays according to some embodiments. The method 400 of FIG. 4 may be practiced, in some embodiments, using antenna arrays similar to those shown in FIG. 1, which are described above. With reference to FIG. 4, the example method 400 comprises, at block 402, creating a first plurality of receive beams at a first antenna array, and creating a second plurality of receive beams at a second antenna array. The example method 400 further comprises, at block 404, detecting a preamble symbol sequence arriving at a first subset of one or more receive beams of the first plurality of receive beams at the first antenna array, and detecting the preamble symbol sequence arriving at a second subset of one or more receive beams of the second plurality of receive beams at the second antenna array. The example method 400 further comprises, at block 406, sorting receive beams of the first subset of one or more receive beams by path length to generate a first sorted list of receive beams, and sorting receive beams of the second subset of one or more receive beams by path length to generate a second sorted list of receive beams. The example method 400 further comprises, at block 408, detecting a first set of data symbols arriving at the first antenna array, and detecting a second set of data symbols arriving at the second antenna array. The example method 400 further comprises, at block 410, determining that data symbols of the first set of data symbols correspond to the first sorted list of receive beams, and determining that data symbols of the second set of data symbols correspond to the second sorted list of receive beams. The example method 400 further comprises, at block 412, grouping the data symbols of the first set of data symbols together with the preamble symbol sequence detected at the first subset of one or more receive beams at the first antenna array, and grouping the data symbols of the second set of data symbols together with the preamble symbol sequence detected at the second subset of one or more receive beams at the second antenna array. The example method 400 further comprises, at block 414, decoding the data symbols of the first set of data symbols, and decoding the data symbols of the second set of data symbols.

The process using the beam sorting algorithm described above improves performance over the previous case where a sorted list of path lengths is not possible to obtain because, in certain cases, there could be multiple transmitters in different locations that are detected by the same set of receive beams. In these cases, the sorted list of receive beams could be different as between the different transmitters. Therefore, sorting the list of receive beams by path length using the algorithm described above allows the transmissions from different endpoints to be differentiated.

The above-described beam sorting algorithm provides an additional benefit in the case where the shortest (direct line-of-sight) path from the transmitter to the receiver is not blocked. In these cases, according to some embodiments a precise X,Y position can be assigned to the transmitter by locating the intersection point of the receive beams from two or more antenna arrays that correspond to the shortest paths. For example, with reference to FIG. 1, there are no obstructions between the transmitter and the first antenna array, so that signals from the transmitter are received at Beam A of the first antenna array along a direct line-of-sight path. Similarly, there are no obstructions between the transmitter and the second antenna array, so that signals from the transmitter are received at Beam C of the second antenna array along a direct line-of-sight path. Since the positions and orientations of the first and second antenna arrays are known, and the directions of propagation of Beam A and Beam C are known, the intersection point of Beam A and Beam C can be computed, and this intersection point corresponds to the location of the transmitter. In various embodiments, as the spacing between (or among) the antenna arrays increases, the accuracy of the position estimate for the transmitter may also be increased. The foregoing process for locating the transmitter advantageously allows for an estimate of the transmitter position without needing to use a satellite-based radiolocation system (e.g., GPS), and can be particularly useful for indoor use cases where satellite-based radiolocation may not be possible due to the satellite signal being blocked by the overhead structure (e.g., the roof and/or overhead floors of the building).

Figure 5:
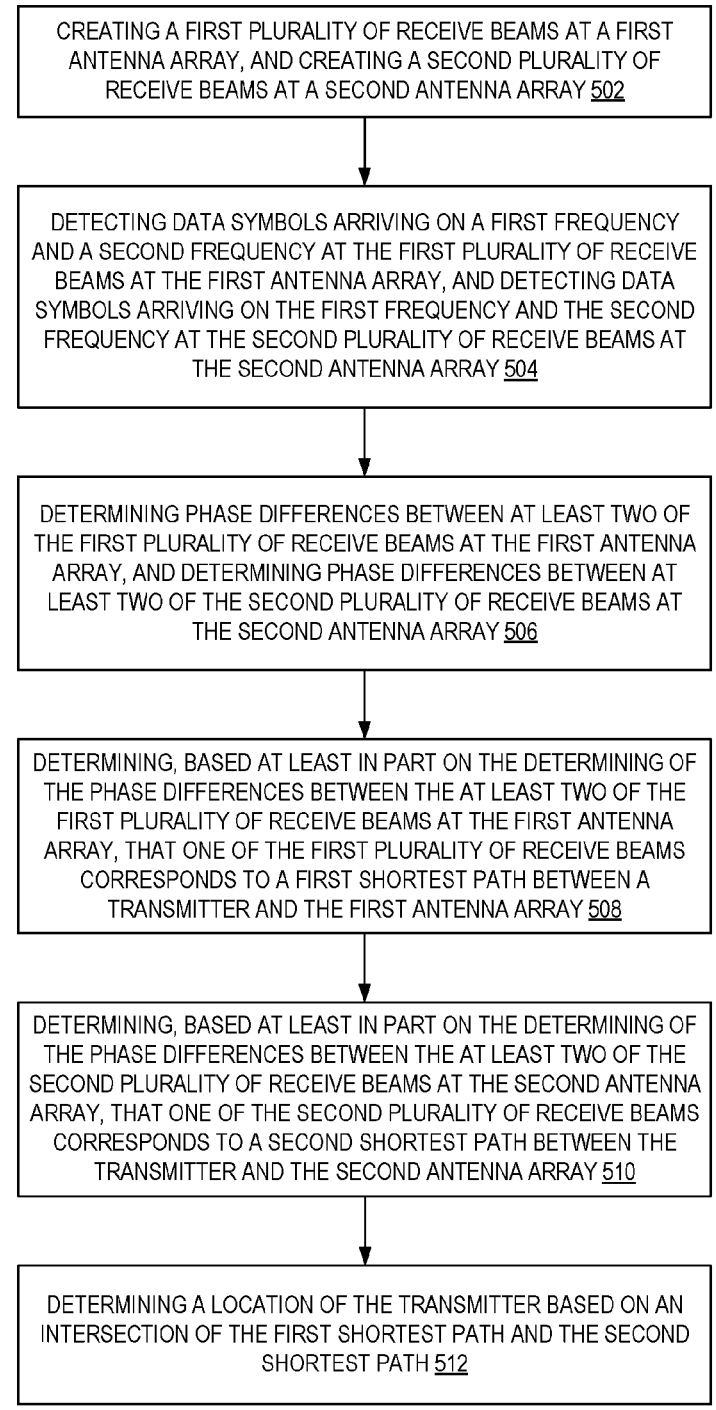
FIG. 5 is a flow diagram illustrating operations of a method for determining the position of a transmitter using the shortest paths from the transmitter to two or more antenna arrays according to some embodiments.

FIG. 5 illustrates an example method 500 for determining the position of a transmitter using the shortest paths from the transmitter to two or more antenna arrays according to some embodiments. The method 500 of FIG. 5 may be practiced, in some embodiments, using antenna arrays similar to those shown in FIG. 1, which are described above. While two antenna arrays are shown in FIG. 1, the method 500 of FIG. 5 may be practiced with more than two antenna arrays, and in some embodiments the accuracy of the determination of the position of the transmitter may be increased as the number of antenna arrays is increased. With reference to FIG. 5, the example method 500 comprises, at block 502, creating a first plurality of receive beams at a first antenna array, and creating a second plurality of receive beams at a second antenna array. The example method 500 further comprises, at block 504, detecting data symbols arriving on a first frequency and a second frequency at the first plurality of receive beams at the first antenna array, and detecting data symbols arriving on the first frequency and the second frequency at the second plurality of receive beams at the second antenna array. The example method 500 further comprises, at block 506, determining phase differences between at least two of the first plurality of receive beams at the first antenna array, and determining phase differences between at least two of the second plurality of receive beams at the second antenna array. The example method 500 further comprises, at block 508, determining, based at least in part on the determining of the phase differences between the at least two of the first plurality of receive beams at the first antenna array, that one of the first plurality of receive beams corresponds to a first shortest path between a transmitter and the first antenna array. The example method 500 further comprises, at block 510, determining, based at least in part on the determining of the phase differences between the at least two of the second plurality of receive beams at the second antenna array, that one of the second plurality of receive beams corresponds to a second shortest path between the transmitter and the second antenna array. The example method 500 further comprises, at block 512, determining a location of the transmitter based on an intersection of the first shortest path and the second shortest path.

In some embodiments, even when the shortest path from the transmitter to the receiver is blocked, a precise X,Y position of the transmitter can still be estimated using a training phase during which the antenna arrays are calibrated for the environment by having a transmitter transmit messages from known positions as it moves around the environment. A sorted list of beams corresponding to each known transmitter position is stored (e.g., in a database) during the calibration phase. This database can then be cross-referenced when a transmitter with an unknown position transmits a message from somewhere within the environment, and a best match from the sorted list of beams (a best match between the actual sorted beam list created when the transmitter sends a message from an unknown position and the sorted beam lists corresponding to all known calibrated positions stored in the database) is used to estimate the position of the transmitter. This process is described in further detail below.

Even with complete blockage of the line-of-sight path, there is still a mechanism to get good position accuracy using RF fingerprinting. During a training phase, a transmitter with a known position moves around the environment (indoor or outdoor) and transmits signals from known positions. For each antenna array, when the transmitter sends a signal the known (X,Y) position of the transmitter (and Z position if available) is logged along with a list of the receive beams that detected the signal at the known position. A sorted list of receive beams (sorted according to path lengths) is then generated using the beam sorting algorithm described above. In some embodiments, the transmitter may be a smartphone with a transmitter that the antenna arrays can receive, or a dedicated transmitter. Some embodiments may leverage Visual SLAM (simultaneous localization and mapping) to position the smartphone or dedicated transmitter during the training phase. In some embodiments, visual markers may be placed on the antenna arrays to assist the SLAM algorithm.

During a positioning phase (after completion of the training phase), a transmitter with an unknown position transmits a signal from within the environment. For each antenna array, when the transmitter sends a signal the receive beams that detected the signal are recorded. A sorted list of receive beams (sorted according to path lengths) is then generated using the beam sorting algorithm described above. The sorted list of receive beams is then compared to the stored lists of sorted receive beams that were created during the training phase, and a closest match is identified. The closest match in stored lists yields the best available estimate for the unknown position of the transmitter.

In some embodiments, for improved performance the symbol frequencies are preferably chosen so that the frequency spacing is not too small but still small enough to avoid the phase wraparound condition mentioned above. For example, with a larger frequency spacing, the phase shift between the two frequencies becomes larger. The exact phase shift will depend on the delay spread in the environment. Since there will be noise in the environment, the noise will change the phase estimate slightly. If the phase shift is too small, the noise in the system could make it harder to differentiate between different path lengths that are fairly close together. At the same time, it would be undesirable to choose the frequency spacing so large that the phase wraps around and the information becomes unusable. In some embodiments, the delay spread of the environment can be measured or estimated to aid in the selection of the symbol frequencies. One non-limiting example of a technique for measuring or estimating the delay spread of the environment is described below. In some embodiments, the accuracy of the position estimate for the transmitter depends on the angular resolution of the antenna array. For example, for a 128-element linear antenna array, with antennas spaced at ½ wavelength, the 10 dB half-beam width is approximately 0.8°, which corresponds to an error of ± 1.4 m at 100 m distance.

In some embodiments, the delay spread in an environment can be measured using a very large bandwidth signal, for example a narrow pulse in the time domain. A pulse can be transmitted from a transmitter, and a receiver can pick up the pulse that was transmitted as well as any reflected pulses due to multipath. The delay spread can then be estimated as the time difference between the first pulse arriving at the receiver and the last pulse arriving at the receiver. In some embodiments, another way to measure the delay spread in an environment is the frequency hopping technique described in U.S. Pat. No. 11,283,516, which is hereby incorporated by reference herein as if fully set forth. However, since the delay spread in the environment is unknow, and it is desirable to avoid wraparound, the frequency hopping technique in some embodiments can start with small frequency steps and work up until the phase gets larger and gets closer to wrapping around. This technique may be used for training static sensors, for example, to help the receiver learn an unknown environment and to help the system pick the best frequency step sizes for that environment. In this case the receiver may be involved in the learning process, and may feed back the optimal frequency step sizes to the sensors. Different sensors in the environment would see different delay spreads, but one approach in some embodiments is to use the sensor that observes the largest delay spread as the delay spread assigned to the environment (indoor or outdoor). If sensors are completely static, the frequency step sizes may also be optimized on a sensor-by-sensor basis starting with a small frequency step approach until the phase difference becomes large enough. If sensors move to a new position, the calibration process can be repeated.

Figure 6:
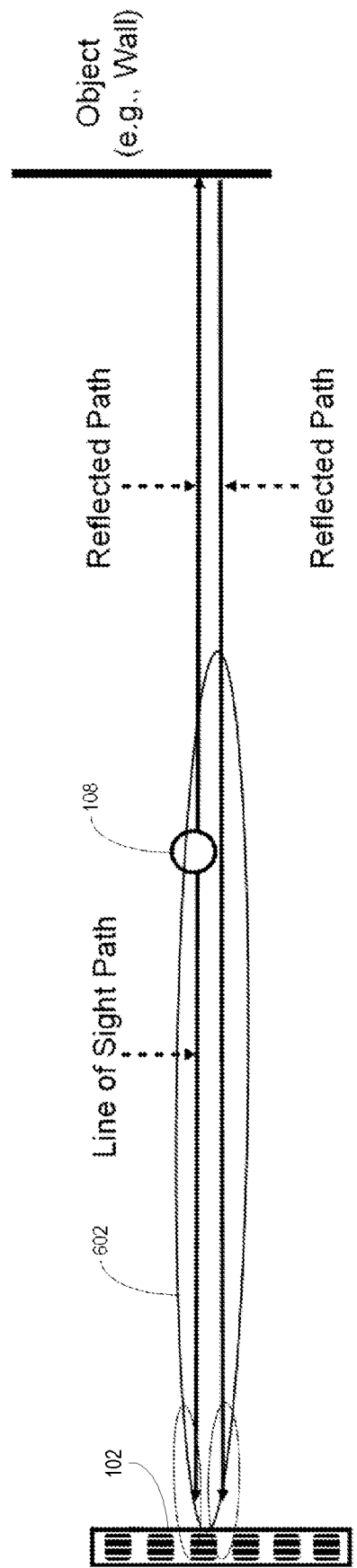
FIG. 6 is a schematic diagram illustrating a case where more than one multipath component can fit into the same receive beam according to some embodiments.

With reference to FIG. 6, there is one rare case where more than one multipath component can fit into the same receive beam. If the transmitter 108 is positioned between the antenna array 102 and an object (e.g., a wall), it is possible that the signal from the transmitter 108 will be detected twice by the same receive beam 602: a first detection along the direct line-of-sight path, and a second detection along a reflected path that extends away from the transmitter 108 and toward the obstruction, and reflects off the obstruction along a path that is substantially parallel to the direct line-of-sight path. In this rare case, it is likely that the reflected path will be much weaker than the line-of-sight path, so that the impact would likely be negligible.

Figure 7:
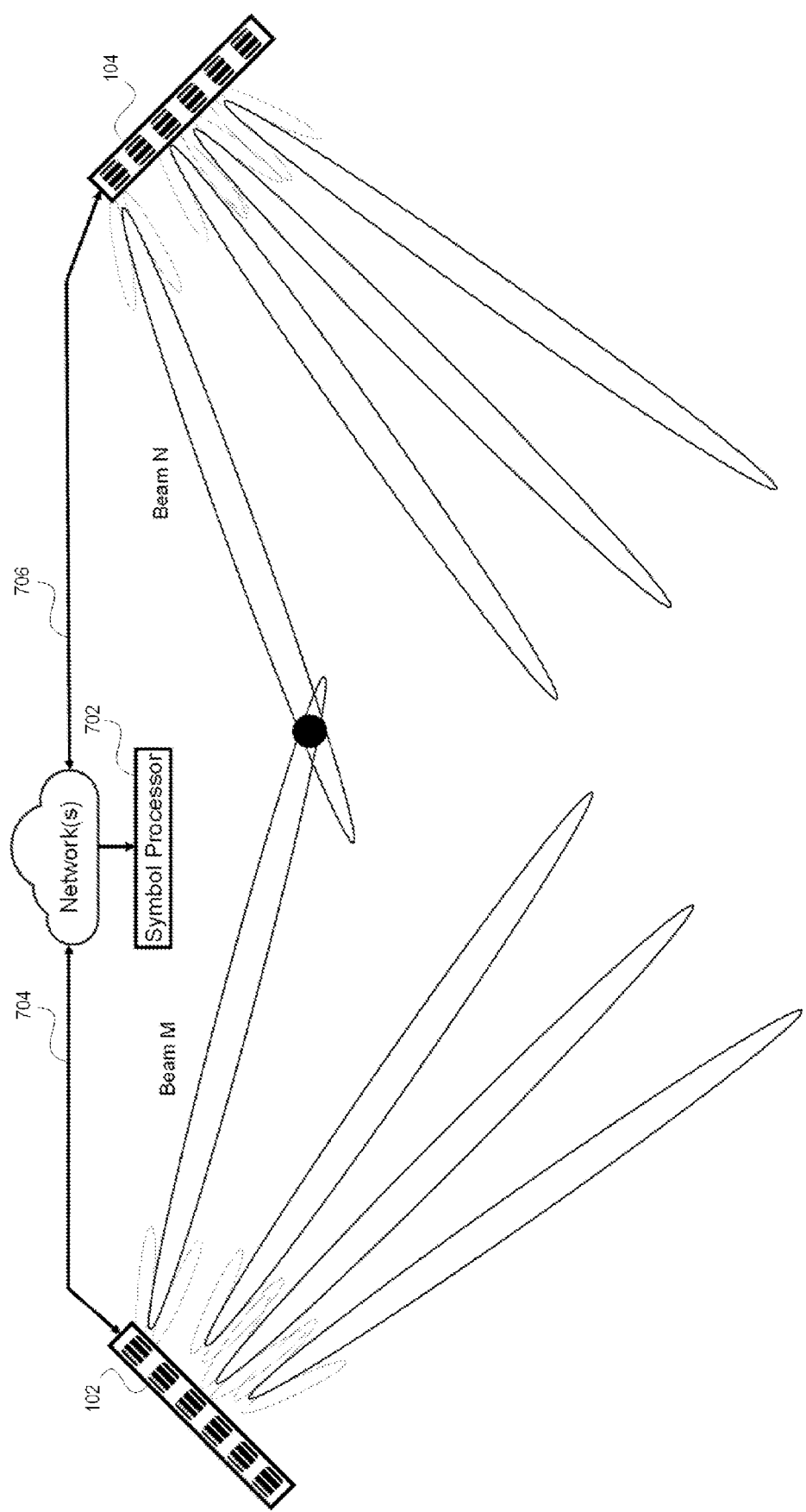
FIG. 7 is a schematic diagram illustrating two spatially separated antenna arrays that are communicatively coupled to a symbol processor via communication channels and one or more networks according to some embodiments.

In the terrestrial use cases described above, since the antenna arrays are spatially separated, the symbols they receive may need to be transmitted (e.g., over wired and/or wireless communication channels) for processing. For example, FIG. 7 illustrates two spatially separated antenna arrays 102, 104 that are communicatively coupled to a symbol processor 702 via communication channels 704, 706 and one or more networks 708 (e.g., the internet and/or a dedicated communication network). In some embodiments, the symbol processor 702 may be co-located with one of the antenna arrays 102, 104, while in other embodiments the symbol processor 702 may be spatially separated from both (or all) of the antenna arrays 102, 104.

Figure 8:
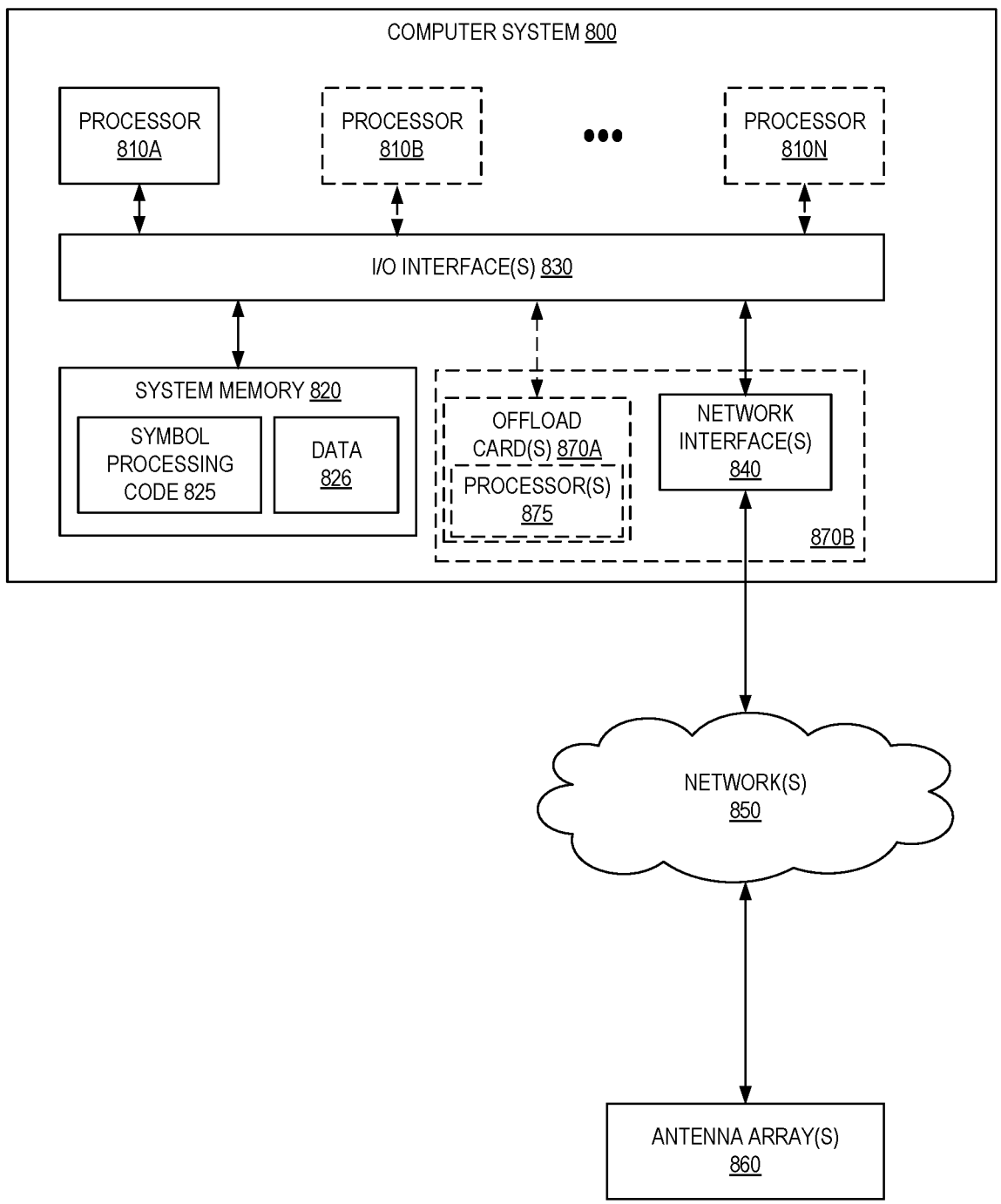
FIG. 8 is a functional block diagram illustrating a general-purpose computer system according to some embodiments.

In some embodiments, the symbol processor 702 may comprise a general-purpose computer system, such as the computer system 800 illustrated in FIG. 8. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as symbol processing code 825 and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect - Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Figure 9:
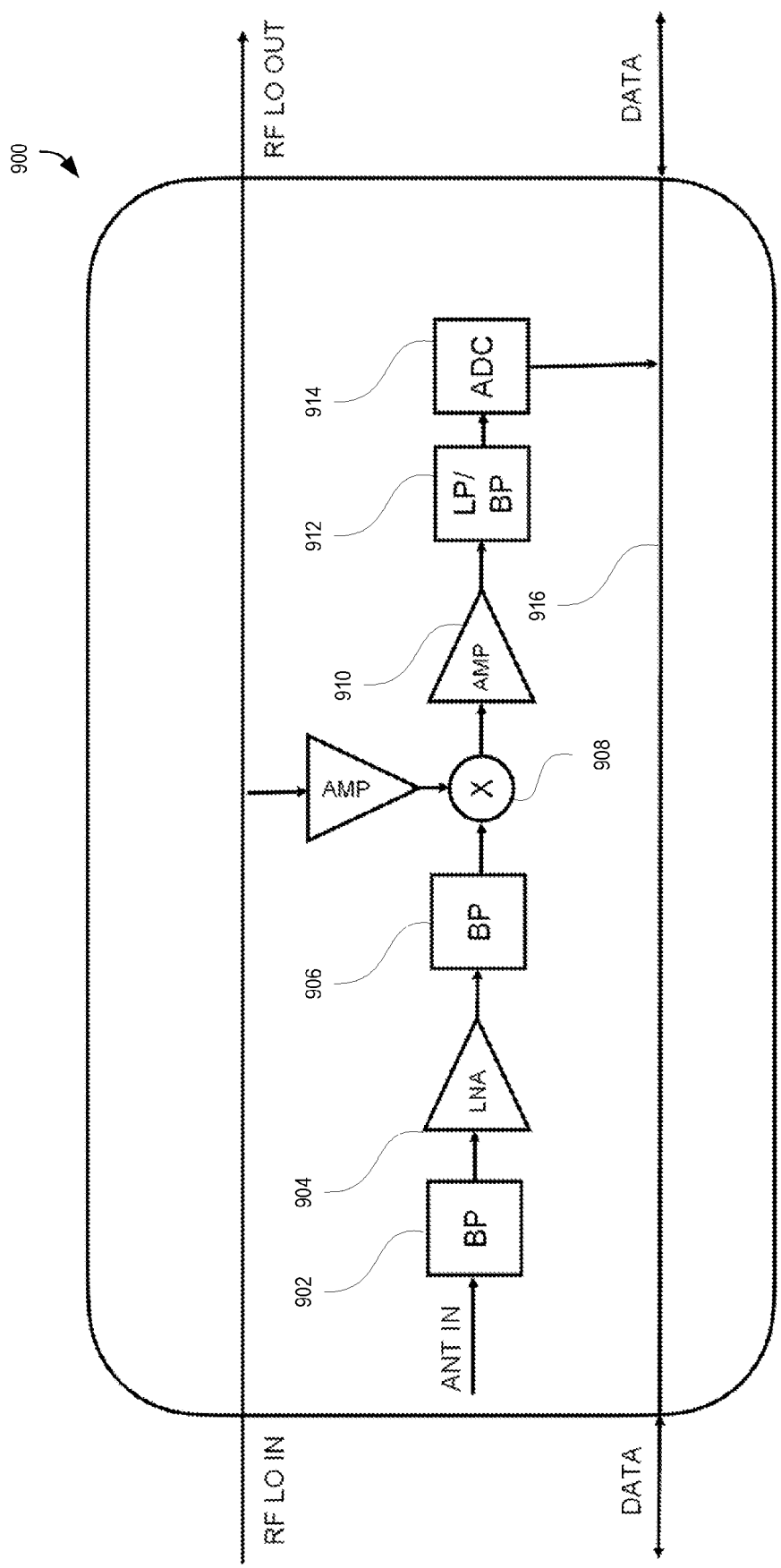
FIG. 9 is a functional block diagram illustrating antenna module receive electronics according to some embodiments.

The block diagram of an embodiment of the antenna module receive electronics 900 is illustrated in FIG. 9. The receive electronics 900 comprises a circuit that is used to down-convert the RF signal to baseband and process the down-converted received signal. Each antenna on the module feeds into a band pass (BP) filter 902 followed by a low noise amplifier (LNA) 904. An additional band pass filter 906 can optionally follow the LNA 904 to further reduce out-of-band noise. An RF mixer 908 down-converts the incoming signal to a lower intermediate frequency (IF). The mixer 908 is followed by an amplifier 910 and an anti-aliasing filter 912. The down-converted signal is then fed into an Analog-to-Digital converter (ADC) 914. The digitized signal is then transmitted, via a communication channel 916, to the symbol processor 702 (FIG. 7). The symbol processor 702 receives baseband signals from antenna modules in the array and performs computations on the signals as described herein.

Figure 10:
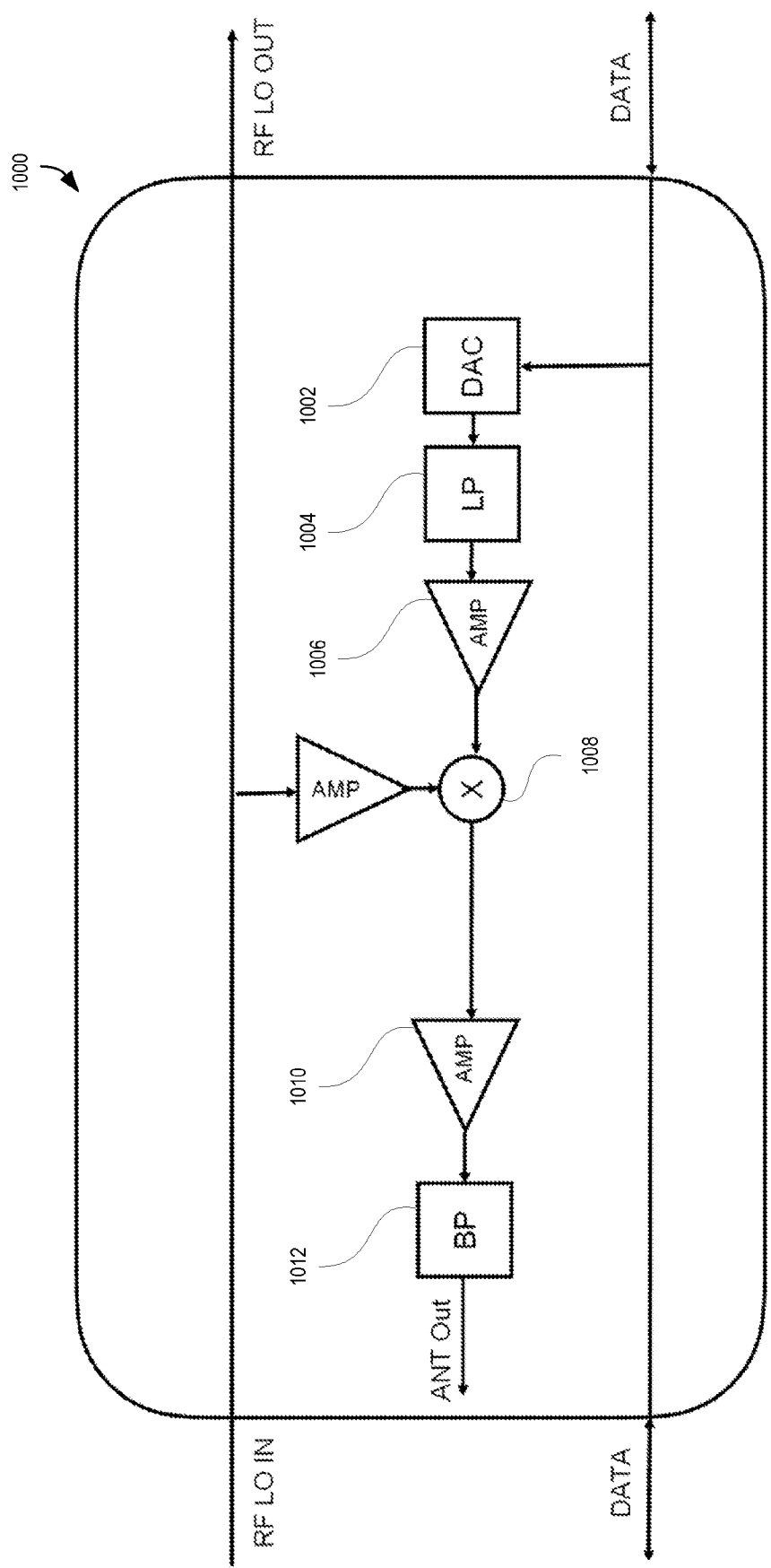
FIG. 10 is a functional block diagram illustrating transmit electronics circuitry according to some embodiments.

In some embodiments, antenna modules are designed to provide bidirectional communication with endpoints by integrating transmit radio electronics into the modules. FIG. 10 illustrates the transmit electronics circuitry 1000, which includes a Digital to Analog converter (DAC) 1002 which receives the digitized, discrete-time, complex baseband information that is to be modulated onto the carrier and converts it into an analog continuous-time signal. The complex baseband signal can optionally be injected into a lowpass filter 1004 to filter out any unwanted out-of-band signals, and then the signal is amplified 1006 and quadrature mixed 1008 with the local oscillator signal. The signal is then further amplified 1010, and optionally filtered 1012 to reduce any out of band harmonics and the signal is then sent to the antenna.

In some embodiments, the receive and transmit electronics 900, 1000 can share the same antenna by time division duplexing the channel, or by using a dual-band antenna that allows for frequency-division duplexing. In other embodiments, separate transmit and receive antennas are mounted on each antenna module to avoid the need to share antennas between the transmit and receive circuits. In the transmit direction of some embodiments, the gain and phase of the complex baseband signal are selected to allow for pointing one or more transmit beams in the direction of one or more endpoints. Multiple beams where each beam contains a different packet transmission can be created simultaneously with the correct choice of gains and phases both in the transmit and in the receive direction.

Figure 11:
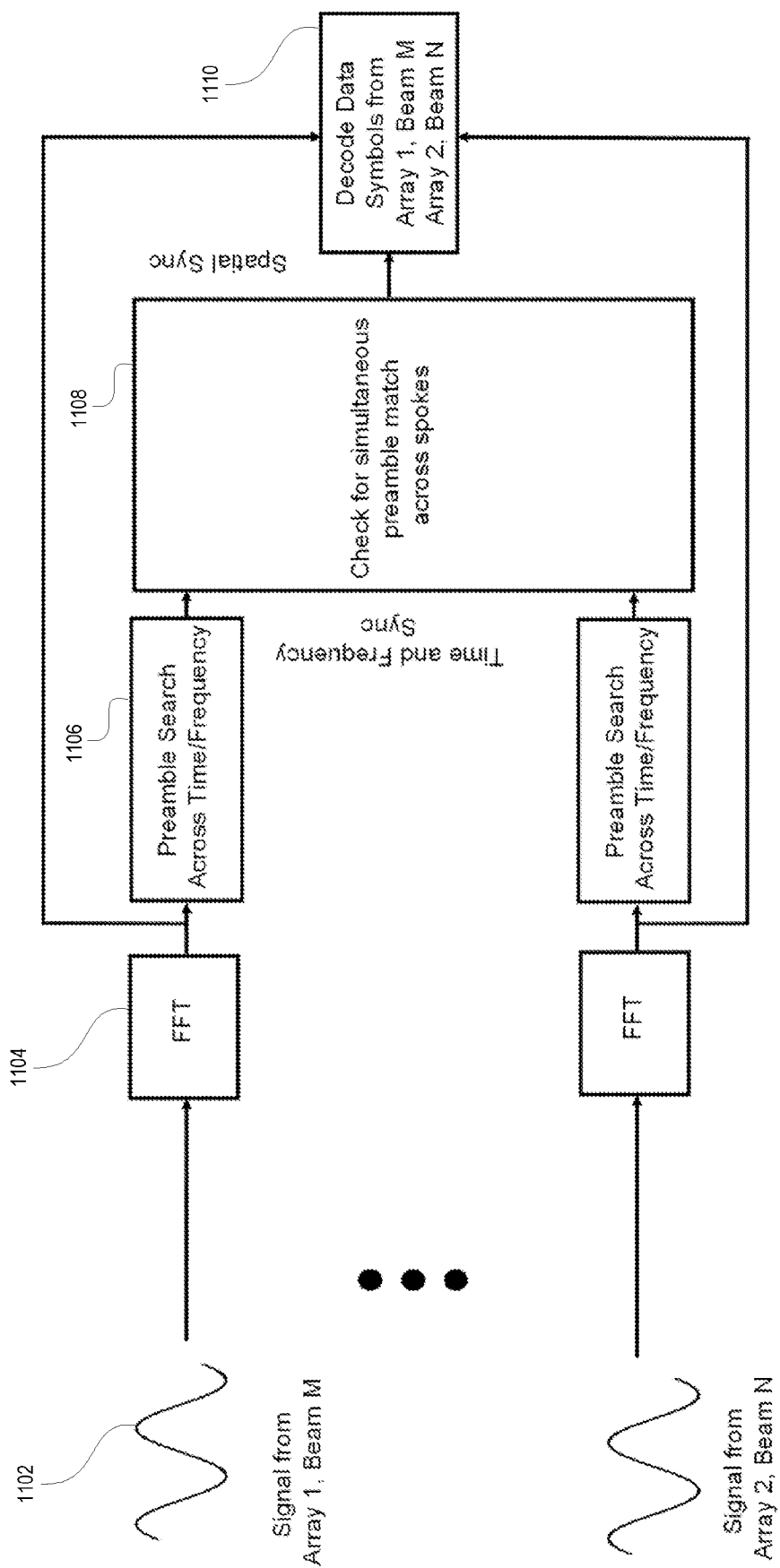
FIG. 11 is a functional block diagram illustrating operation of an orthogonal signal decoder for different orthogonal modulations according to some embodiments.

One example of an orthogonal signal decoder for different orthogonal modulations, according to some embodiments, is described in more detail with reference to FIG. 11, which shows the reception of an M-ARY FSK signal 1102 where one of M orthogonal frequency tones are selected at the transmitter to encode a bit sequence. At the receiver, for each beam of each antenna array, the signal is fed into an FFT (Fast Fourier Transform) 1104. In some embodiments, the sample rate of the incoming signal into the FFT 1104 is set to the bandwidth of the communication channel, and the number of samples per FFT computation is set to the symbol duration multiplied by the sample rate. For each antenna array beam, a preamble detector 1106 searches over time and frequency for the preamble symbol sequence. When the preamble detector 1106 detects a valid preamble, the circuit has obtained frequency and time synchronization with the incoming data packet. The preamble detector 1106 outputs from all antenna arrays and beams are fed into a processor 1108, which checks to see if there are valid preamble sequences that appear at the same time and frequency on receive beams of two different arrays. Once the processor 1108 detects a valid preamble sequence arriving on two different arrays at the same time, the decoder is now time, frequency, and spatially synchronized. FIG. 11 shows an example where Array 1 Beam M and Array 2 Beam N both detect the preamble simultaneously. A decoder 1110 then decodes the data symbols arriving at the proper time, frequency, and space.

Another example of an orthogonal signal that can be used with some embodiments of the present antenna array receivers is the Chirp Spread Spectrum (CSS) signal. In CSS embodiments, a CSS-modulated signal modulates bits based on a cyclical time shift of a base chirp signal (a chirp with zero time delay). At the receiver, for each beam of each array the chirp signal is convolved by the base chirp signal. After convolution, when the received symbols line up in time with the base chirp, the resultant signal is simply an M-ARY FSK modulated signal. The convolved signal is then fed into an FFT block and the remaining part of the decoding process is identical to the M-ARY FSK decoding process described above with reference to FIG. 11.

The above examples demonstrated orthogonal signaling over the frequency dimension (M-ARY FSK, Chirp Spread Spectrum). In some embodiments, it is also possible to achieve orthogonal signaling over the time dimension, the code dimension, or a combination of frequency, time, and code dimensions. To achieve orthogonality over the time and/or the code dimensions, Direct Sequence Spread Spectrum (DSSS) signals may be used in some embodiments. For example, to achieve orthogonality over the code dimension, M DSSS signals may be generated. Each symbol is orthogonal to other symbols, and each symbol encodes $\log_2(M)$ bits. To achieve orthogonality over the time dimension, a DSSS signal with good self-orthogonal properties may be chosen, such that time shifts of the same code sequence are orthogonal to other time shifts for multiples of the chip period T. Sets of DSSS signals that achieve orthogonality over both the time and code dimensions can be chosen as well. To achieve orthogonality over the frequency and time dimensions, a DSSS signal with good self-orthogonal properties can modulate an M-ARY FSK signal. To achieve orthogonality over the frequency, time, and code domains, a set of K orthogonal DSSS signals may be chosen, where each DSSS signal also has good self-orthogonal properties. Each DSSS signal modulates an M-ARY FSK signal. To encode $\log_2(M*K*T)$ bits per symbol, one of M of the FSK tones is selected, modulated by one of the K orthogonal DSSS signals, and then time shifted by one of T time shifts. As more orthogonal dimensions are added, the decoder computational complexity increases.

In some embodiments, for a decoder that can decode across orthogonal frequency and time dimensions, a DSSS signal with good self-orthogonal properties modulates an M-ARY FSK signal. At the receiver, for each beam of each array, the received signal is convolved with the DSSS signal-matched filter. When the received symbol lines up in time with the matched filter, the result is an M-ARY FSK signal. That signal is fed into an FFT block and the remaining part of the decoding process is identical to the M-ARY FSK decoding process described above with reference to FIG. 11, except that bits can also be encoded in time shifts of the symbol.

In some embodiments, for a more computationally complex decoder that can decode symbols over all three of the frequency, time, and code dimensions, a DSSS signal is selected from an alphabet of K orthogonal codes, where each code has good self-orthogonal properties and modulates an M-ARY FSK signal. A time shift T is also added to each transmission to encode bits along the time dimension. At the receiver, for each beam and each array, the received signal is convolved with a bank of matched filters, where each matched filter is one of the K DSSS signals. When the received symbol lines up in time with one of the matched filters, the result is an M-ARY FSK signal. Each of the matched filter outputs is fed into an FFT block and the remaining part of the decoding process is identical to the M-ARY FSK decoding process described above with reference to FIG. 11, except that additional bits can also be encoded in time shifts of the symbol and in the code that was chosen for each symbol. The preamble detector now searches over time, frequency, and the code dimensions during the preamble search process.

In the preceding description, various embodiments are described. For purposes of explanation, specific configurations and details are set forth in order to provide a thorough understanding of the embodiments. However, it will also be apparent to one skilled in the art that the embodiments can be practiced without the specific details. Furthermore, well-known features can be omitted or simplified in order not to obscure the embodiment being described.

Bracketed text and blocks with dashed borders (e.g., large dashes, small dashes, dot-dash, and dots) are used herein to illustrate optional aspects that add additional features to some embodiments. However, such notation should not be taken to mean that these are the only options or optional operations, and/or that blocks with solid borders are not optional in certain embodiments.

Reference numerals with suffix letters (e.g., 810A-810N) can be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various embodiments.

References to "one embodiment," "an embodiment," "an example embodiment," etc., indicate that the embodiment described can include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean any of A, B, or C, or any combination thereof (e.g., A, B, and/or C). Similarly, language such as "at least one or more of A, B, and C" (or "one or more of A, B, and C") is intended to be understood to mean any of A, B, or C, or any combination thereof (e.g., A, B, and/or C). As such, disjunctive language is not intended to, nor should it be understood to, imply that a given embodiment requires at least one of A, at least one of B, and at least one of C to each be present.

As used herein, the term "based on" (or similar) is an open-ended term used to describe one or more factors that affect a determination or other action. This term does not foreclose additional factors that may affect a determination or action. For example, a determination may be solely based on the factor(s) listed or based on the factor(s) and one or more additional factors. Thus, if an action A is "based on" B, then B is one factor that affects action A, but this does not foreclose the action A from also being based on one or more other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (meaning having the potential to), rather than the mandatory sense (meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A method comprising:
    creating a first plurality of receive beams at a first antenna array;
    creating a second plurality of receive beams at a second antenna array;
    detecting a preamble symbol sequence arriving at a first subset of one or more receive beams of the first plurality of receive beams at the first antenna array;
    detecting the preamble symbol sequence arriving at a second subset of one or more receive beams of the second plurality of receive beams at the second antenna array;
    detecting a first set of data symbols arriving at the first antenna array;
    detecting a second set of data symbols arriving at the second antenna array;
    determining that data symbols of the first set of data symbols were detected by the first subset of one or more receive beams of the first plurality of receive beams at the first antenna array;
    determining that data symbols of the second set of data symbols were detected by the second subset of one or more receive beams of the second plurality of receive beams at the second antenna array;

grouping the data symbols of the first set of data symbols together with the preamble symbol sequence detected at the first subset of one or more receive beams at the first antenna array;

grouping the data symbols of the second set of data symbols together with the preamble symbol sequence detected at the second subset of one or more receive beams at the second antenna array;

decoding the data symbols of the first set of data symbols; and decoding the data symbols of the second set of data symbols.

2. The method of claim 1, wherein the first and second antenna arrays are mounted such that a long axis of each of the first and second antenna arrays is parallel to the ground and in an orientation that allows for creation of radio beams parallel to the ground.

3. The method of claim 1, wherein the data symbols of the first and second sets of data symbols are modulated using one of M-ARY Frequency Shift Keying modulation, Chirp Spread Spectrum modulation, or Direct Sequence Spread Spectrum signals.

4. A method comprising:

creating a plurality of receive beams at an antenna array;

detecting a preamble symbol sequence arriving at a subset of one or more of the receive beams at the antenna array;

detecting a set of data symbols arriving at the antenna array;

determining that data symbols of the set of data symbols were detected by the subset of one or more of the receive beams;

grouping the data symbols of the set of data symbols together with the preamble symbol sequence; and decoding the data symbols of the set of data symbols.

5. The method of claim 4, wherein the antenna array is mounted such that a long axis of the antenna array is parallel to the ground and in an orientation that allows for creation of radio beams parallel to the ground.

6. The method of claim 4, wherein the data symbols of the set of data symbols are modulated using one of M-ARY Frequency Shift Keying modulation, Chirp Spread Spectrum modulation, or Direct Sequence Spread Spectrum signals.

* * * * *